United States Patent [19]
Schoer et al.

[11] 3,811,177
[45] May 21, 1974

[54] PROCESS FOR BRAZING WORKPIECES OF ALUMINUM CONTAINING MATERIAL

[75] Inventors: Heinz Schoer, Alfter; Werner Schultze, Bonn, both of Germany

[73] Assignee: Vereinigte Aluminium-Werke Aktiengesellschaft, Bonn, Germany

[22] Filed: Aug. 29, 1972

[21] Appl. No.: 285,100

Related U.S. Application Data

[63] Continuation-in-part of Ser. No. 98,173, Dec. 14, 1970, abandoned.

[30] Foreign Application Priority Data

Dec. 15, 1969 Germany............................ 1962760
June 11, 1970 Germany............................ 2028683
Sept. 2, 1971 Germany............................ 2143965

[52] U.S. Cl....................... 29/494, 29/504, 75/140, 75/141, 75/142, 75/143, 75/144, 75/146, 75/147, 75/148
[51] Int. Cl....................... B23k 31/02, B23k 35/38
[58] Field of Search........ 29/494, 495, 504; 75/148, 75/147, 146, 140, 141, 142, 143, 178 A

[56] References Cited
UNITED STATES PATENTS

| | | | |
|---|---|---|---|
| 722,273 | 3/1903 | Baldwin et al. | 75/178 A |
| 1,612,151 | 12/1926 | Richardson | 75/178 A |
| 2,026,566 | 1/1936 | Kempf et al. | 75/148 |
| 2,733,168 | 1/1956 | Hodge et al. | 29/504 X |
| 2,870,008 | 1/1959 | New | 75/146 X |
| 2,937,435 | 5/1960 | Brenner et al. | 29/504 X |
| 2,969,590 | 1/1961 | Milliken | 29/494 X |
| 3,031,298 | 4/1962 | Derntl | 75/142 X |
| 3,252,841 | 5/1966 | Foerster | 75/148 X |
| 3,466,170 | 9/1969 | Dunkel et al. | 75/148 |

OTHER PUBLICATIONS

Welding and Cutting Terms and Definitions, prepared by American Welding Society Committee on Definitions and Symbols, pp. 1–3, 15, 30, 47, 48.

*Primary Examiner*—J. Spencer Overholser
*Assistant Examiner*—Ronald J. Shore
*Attorney, Agent, or Firm*—Michael S. Striker

[57] ABSTRACT

A process for brazing aluminum-containing workpieces wherein the brazing filler metal contains components which lower the surface tension and the viscosity of the molten brazing filler metal, and which lower the interfacial tension between the brazing filler metal and the aluminum-containing work-pieces. Useful components are Bi, Sr, Ba, Sb and Be. The brazing filler metal may be used with or without flux.

14 Claims, No Drawings

3,811,177

PROCESS FOR BRAZING WORKPIECES OF ALUMINUM CONTAINING MATERIAL

CROSS-REFERENCE TO RELATED APPLICATIONS

This application is a continuation-in-part of our co-pending application Ser. No. 98,173, filed Dec. 14, 1970, and now abandoned, and entitled "Process and Solder for Soldering Aluminum-Containing Work-Pieces".

BACKGROUND OF THE INVENTION

In the soldering or brazing process, in contrast to what happens during welding, the added metal must melt, but the work-piece itself must not melt. For this reason, the melting region of the solder or brazing filler metal and the work temperature must lie beneath the melting point of the work-piece.

In the soldering or brazing of aluminum and aluminum alloys, a serious problem exists, by reason of the fact that a very tough layer of oxide is present on the surface and prevents the molten filler metal from wetting the metal beneath. Although this oxide layer is very thin, it is nevertheless dense and stable, and after removal, a new film spontaneously reforms even during the joining process, so long as the operation is being carried out in an oxidizing atmosphere such as air. It has hitherto been necessary for the joining of aluminum-containing work-pieces that the oxide layer be removed from the region where the joining is to take place either by mechanical or by chemical means. One method has been friction soldering, a special technique in which solder is applied and the oxide layer is removed through the molten solder. In a variation of this technique, supersonic soldering has been attempted, but it has not reached common usage.

Apart from such special processes, the removal of the oxide layer has been carried out by means of fluxes which, in addition, prevent the formation of a new oxide layer. The fluxes suitable for use in the joining of aluminum in general use chlorides or fluorides and for soldering, pure organic compounds are also used. All fluxes have the disadvantage that they lead to corrosion, most leading to very strong corrosion, and consequently residues must be completely removed. Moreover, there is always the danger of inclusion of flux in the joint. Residues and inclusions of flux damage the corrosion resistance of the joint, especially when dampness has access to the joint. Removal of flux residues is costly and consequently is generally not complete. It is for such reasons that research has been directed to solders and especially brazing filler metals which can operate without fluxes.

The difficulties described above become especially significant when the standards of strength and corrosion resistance for a joint are raised. Filler metals previously used for aluminum without flux have consequently not matured to actual practice or commercial production. As examples of what has been proposed in U.S. patents or publication of processes, it is recommended that the oxide layer be removed either through exothermic reaction or by reduction at the location where the joint is to be made, and this be carried out either in a high vacuum at about $10^{-6}$ Torr, or with a combination of a reduction process in a vacuum of about $10^{-4}$ Torr. In such processes, the filler metal, as well as any additional components, are generally added in the form of a mixture of powder.

In addition to the very dubious efficiency of the removal of oxide by the foregoing methods, these methods also have the disadvantages that the powder must be protected from oxidation during preparations and stratification of the components must be prevented when applied to the work-piece, making such processes unsuitable for quantity production. Also, large-scale use of high vacuum for joining results in large costs for preparation and operation. Consequently, such processes can be used in only very special cases such as for the manufacture of parts to be used with reactors or rockets.

As a general rule, the filler metals used for joining aluminum-containing work-pieces have the disadvantages of relatively high viscosity and surface tension, as well as poor wetting characteristics. This is particularly true for brazing filler metals which, as stated above, have special significance. Such brazing filler metals are usually of the Al-Si type which may also contain copper, magnesium, nickel, zinc, tin and cadmium. In addition to the commercial solders, there are filler metals of the fundamental composition Zn-Al which, according to the particular composition and thereby the operating temperature, can be rated either as brazing filler metals or as solders.

In order to avoid the difficulties of high viscosity and high surface tension, the flux contains in part additives in the form of zinc salts which produce a metal layer on the cleaned parent metal surface and increase the wetting by the filler metal at the point of joining.

In the German Pat. No. 66,398, issued in the year 1891, a method of preparation of filler metal to be used for joining pure aluminum or nearly pure aluminum was disclosed in which a substantial portion of the pure aluminum was melted and then the surface of the molten metal was covered with a layer of phosphoric acids, acid sodium sulfate, fluorine compounds or other acidic salts and finally, to the molten metal was added a small quantity of copper and tin, or copper, bismuth, zinc and tin, or copper antimony, bismuth and zinc, or copper bismuth, antimony and tin. Despite the length of the period since the disclosure of this process, it has never come into practice. Such a filler metal would not be practical owing to the small difference in temperature between the melting point of the filler metal and of the work-piece, and the only reason why it was considered at all, was due to the fact that the melting point of aluminum was thought to be 800°C. at that time (page 1, left-hand column, paragraph 2, of German Pat. No. 66,398).

As was stated above, the fundamental problem in the joining of aluminum lies in the fact that the workpiece is always covered with an oxide skin which is only poorly wetted by the molten filler metal. It was therefore, previously concluded, that for the achievement of satisfactory joints on aluminum-containing work-pieces, the oxide skin must be broken down and removed.

SUMMARY OF THE INVENTION

In contrast to the view previously adopted with respect to the problem of joining aluminum-containing work-pieces, we have found that the wettability of the region to be soldered or brazed can be greatly improved by the addition of materials other than those which have been previously used for this purpose, where the new alloying elements reduce the viscosity and the surface tension of the molten filler metal and similarly reduce the interfacial tension between the molten filler metal and the work-piece.

DESCRIPTION OF THE PREFERRED EMBODIMENTS

As our researches have shown, a strong reduction of the viscosity and the surface tension of the molten filler metal, as well as of the interfacial tension between the molten filler metal and the work-piece, can be achieved by the addition of bismuth, and/or strontium, and/or barium, and/or antimony in quantities of 0.01 to 10 percent, and preferably 0.05 to 2 percent, where these materials are free of either silicon or purest aluminum. However, it is also possible to prepare a suitable brazing filler metal which contains at least 6 percent silicon as well as bismuth and/or strontium, and/or barium, and/or antimony in quantities of 0.01 to 10 percent, and preferably 0.05 to 2 percent.

Suitable filler metals can be considered as consisting of the following alloy types:
 a. Al-Si type containing 4 to 20 percent by weight of Si, optionally with varying quantities of other alloying elements and further alloy components such as Cu, Mg, Ni, Zn, Sn and/or Cd with the remainder being Al;
 b. 2–26 percent by weight of Al (maximum purity 99.8 percent) with the remainder being zinc; and
 c. between 26–45 percent by weight of Al (maximum purity 99.8 percent), optionally up to 1 percent of Mn with the remainder of the alloy being Zn.

Filler metals of the types described above, as well as other filler metals, preferably contain small quantities of Bi, and/or Sr, and/or Ba, and/or Sb.

As our researches have shown, filler metals such as we have described, have been found to be suitable for fluxless joining of aluminum when such joining is carried out in non-oxidizing atmosphere, or in an atmosphere containing a small quantity of oxygen. A suitable method is to use an inert gas such as welding argon, nitrogen of commercial purity, forming gas or ammonia. Another method is to work in a low vacuum lying for instance between $10^{-1}$ and 10 Torr. Vacua in the range of $10^{-4}$ to $10^{-6}$ as have been proposed for previously described methods of fluxless joining, are definitely unnecessary for the processes of the present invention. More than conventional precautions such as the careful cleaning and drying of the area which have hitherto been necessary, are not required for the present process. As with other fluxless processes, the present process has the advantage that acid treatment to remove flux residues is not necessary.

The above-described reduction of the surface tension and the viscosity, and the thereby improved wetting properties are also, naturally, an advantage when joining is carried out with an added flux. By the use of filler metals, in accordance with the present invention, the addition of special materials to the flux to improve the wetting properties can be omitted. Moreover, the composition of the flux can be altered in such a way that advantages are achieved in the removal of flux residues. Filler metals of the compositions described can be prepared in all of the commercially used forms, such as wire, bars, shaped parts, foil and plates.

Following are examples of filler metal compositions in accordance with the present invention:

EXAMPLE 1

| | |
|---|---|
| Si | 11.7% |
| Mn | 0.09% |
| Mg | 0.03% |
| Fe | 0.35% |
| Ti | 0.02% |
| Cu | 0.02% |
| Zn | 0.05% |
| Bi | 0.15% |
| Remainder aluminum | |

EXAMPLE 2

| | |
|---|---|
| Si | 12.3% |
| Mn | 0.07% |
| Mg | 0.02% |
| Fe | 0.25% |
| Ti | 0.01% |
| Cu | 0.01% |
| Zn | 0.04% |
| Bi | 0.50% |
| Sb | 0.31% |
| Remainder aluminum | |

EXAMPLE 3

| | |
|---|---|
| Si | 7.2% |
| Mn | 0.07% |
| Mg | 0.03% |
| Fe | 0.63% |
| Ti | 0.04% |
| Cu | 0.18% |
| Zn | 0.11% |
| Bi | 1.95% |
| Remainder aluminum | |

EXAMPLE 4

| | |
|---|---|
| Si | 8.1% |
| Mn | 0.05% |
| Mg | 0.02% |
| Fe | 0.49% |
| Ti | 0.02% |
| Cu | 0.13% |
| Zn | 0.09% |
| Ba | 2.13% |
| Sr | 0.76% |
| Remainder aluminum | |

EXAMPLE 5

| | |
|---|---|
| Si | 15.8% |
| Mn | 0.03% |
| Mg | 0.04% |
| Fe | 0.41% |
| Ti | 0.03% |
| Cu | 0.11% |
| Zn | 0.18% |
| Sb | 1.11% |
| Ba | 1.37% |
| Remainder aluminum | |

EXAMPLE 6

| | |
|---|---|
| Si | 16.5% |
| Mn | 0.03% |
| Mg | 0.03% |
| Fe | 0.43% |
| Ti | 0.03% |
| Cu | 0.13% |
| Zn | 0.17% |
| Ba | 1.78% |
| Remainder aluminum | |

EXAMPLE 7

| | |
|---|---|
| Zn | 95.7% |
| Al | 3.95% |
| Bi | 0.34% |
| Impurities 0.01% | |

EXAMPLE 8

| | |
|---|---|
| Zn | 94.23% |
| Al | 5.10% |
| Bi | 0.18% |
| Ba | 0.47% |
| Impurities 0.02% | |

EXAMPLE 9

| | |
|---|---|
| Zn | 67.59% |
| Al | 30.40% |
| Sb | 1.56% |
| Mn | 0.35% |
| Impurities 0.10% | |

EXAMPLE 10

| | |
|---|---|
| Zn | 68.10% |
| Al | 28.73% |
| Sr | 2.67% |
| Mn | 0.33% |
| Impurities 0.09% | |

The filler metals whose compositions are given in the above examples were prepared from pure aluminum and Al-Mn sheets with the stated additions and were heated in an electrically-heated oven. In all cases, joining was carried out without fluxes in a protective gas atmosphere, such as argon or nitrogen. The brazing temperature for Al-Si brazing filler metals lay between 590 and 605° C., for the Zn-Al brazing filler metals between 530 and 545° C., and for the Zn-Al solders was between 400 and 415°C. The joining time amounted to about 2 minutes. In all cases, satisfactory joints were achieved.

In contrast thereto, attempts to prepare joints with aluminum-containing work-pieces using the commercial filler metals L-AlSi 12 and ZnAl 4 failed when no flux was used. The composition of the L-AlSi 12 brazing filler metal is as follows:

| | |
|---|---|
| Si | 11 - 13.5 |
| Mn | up to 0.1 |
| Fe | up to 0.4 |

Ti up to 0.03
Cu up to 0.03
Zn up to 0.07
other individual components 0.03
total of other components 0.05
Al remainder Note: all quantities are in weight percent.

The composition of the ZnAl 4 solder is as follows:

Al 3.9
impurities 0.04 (Cu, Mg, Si, Fe, B, Cd, Pb)
remainder Zn

Both filler metals were produced by Vereinigte Aluminium-Werke Aktiengesellschaft, Bonn.
Note: All quantities are in weight percent.

Vibration of the sample during the joining process did not improve the results.

Further research has shown that the addition of Be to filler metals of the types described above also provides all of the advantages outlined earlier. The addition of Be to the above types of filler metals may be made either in conjunction with or instead of the additions of Bi, and/or Sr, and/or Ba, and/or Sb. The Be content may lie between 0.00001 and 1.0 percent but is preferably in the range of 0.0002 – 0.1 percent. In the following examples, brazing filler metal compositions in accordance with this embodiment of the present invention are presented.

| | EXAMPLE 11 | | EXAMPLE 12 |
|---|---|---|---|
| Si | 12.1% | Si | 11.9% |
| Mn | 0.10% | Mn | 0.08% |
| Mg | 0.02% | Mg | 0.01% |
| Fe | 0.38% | Fe | 0.32% |
| Ti | 0.02% | Ti | 0.01% |
| Cu | 0.01% | Cu | 0.02% |
| Zn | 0.04% | Zn | 0.03% |
| Be | 0.004% | Bi | 0.04% |
| Remainder aluminum | | Be | 0.014% |
| | | Remainder aluminum | |

| | EXAMPLE 13 | | EXAMPLE 14 |
|---|---|---|---|
| Si | 7.4% | Si | 9.8% |
| Mn | 0.06% | Mn | 0.05% |
| Mg | 0.03% | Mg | 0.02% |
| Fe | 0.48% | Fe | 0.27% |
| Ti | 0.02% | Ti | 0.01% |
| Cu | 0.03% | Cu | 0.02% |
| Zn | 0.10% | Zn | 0.08% |
| Be | 0.083% | Bi | 0.75% |
| Remainder aluminum | | Be | 0.036% |
| | | Remainder aluminum | |

Note: all quantities are in weight percent.

Also, none of the above examples are intended in any way to limit the scope of the present invention but serve merely to illustrate the preferred embodiments. The filler metal compositions may be varied as necessary to suit particular requirements.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a process of brazing aluminum-containing workpieces, the step of brazing said workpieces with a filler metal consisting essentially of 4–20 percent by weight of Si, and 0.00001–1.0 percent by weight of Be, the remainder being substantially Al, said Be lowering the viscosity and surface tension of said filler metal in its molten state and substantially decreasing the interfacial tension between the molten filler metal and said workpieces, and said step being performed without a flux and in a substantially non-oxidizing atmosphere.

2. In a process as defined in claim 1, wherein said filler metal contains 0.002–0.1 percent by weight of Be.

3. In a process of brazing aluminum-containing workpieces, the step of brazing said workpieces with a filler metal consisting essentially of 4–20 percent by weight of Si, 0.00001–1.0 percent by weight of Be, and 0.01–10 percent by weight of at least one substance selected from the group consisting of Bi, Sr, Ba and Sb, the remainder being substantially Al, said Bi, Sr, Ba, Sb and Be lowering the viscosity and surface tension of the filler metal in its molten state and substantially decreasing the interfacial tension between the molten filler metal and said workpieces, and said step being performed without a flux and in a substantially non-oxidizing atmosphere.

4. In a process as defined in claim 3, wherein said filler metal contains 0.002–0.1 percent by weight of Be.

5. In a process as defined in claim 3, wherein said filler metal contains 0.05–2 percent by weight of said at least one substance.

6. In a process of brazing aluminum-containing workpieces, the step of brazing said workpieces with a filler metal consisting essentially of 4–20 percent by weight of Si, 0.00001–1.0 percent by weight of Be, and at least one element selected from the group consisting of Cu, Mg, Ni, Sn, Zn and Cd, the remainder being substantially Al, and where present said Cu constituting 0.05–4.7 percent by weight of said filler metal, said Mg constituting 0.05–10 percent by weight of said filler metal, said Ni constituting 0.03–4 percent by weight of said filler metal, said Sn constituting 0.03–12 percent by weight of said filler metal, said Zn constituting 9.3–10.7 percent by weight of said filler metal, and said Cd constituting 0.03–12 percent by weight of said filler metal, said Be lowering the viscosity and surface tension of said filler metal in its molten state and substantially decreasing the interfacial tension between the molten filler metal and said workpieces, and said step being performed without a flux and in a substantially non-oxidizing atmosphere.

7. In a process as defined in claim 6, wherein said filler metal contains 0.002–0.1 percent by weight of Be.

8. In a process of brazing aluminum-containing workpieces, the step of brazing said workpieces with a filler metal consisting essentially of 4–20 percent by weight of Si, 0.00001–1.0 percent by weight of Be, 0.01–10 percent by weight of at least one substance selected from the group consisting of Bi, Sr, Ba and Sb, and at least one element selected from the group consisting of Cu, Mg, Ni, Sn, Zn and Cd, the remainder being substantially Al, and where present said Cu constituting 0.05–4.7 percent by weight of said filler metal, said Mg constituting 0.05–10 percent by weight of said filler metal, said Ni constituting 0.03–4 percent by weight of said filler metal, said Sn constituting 0.03–12 percent by weight of said filler metal, said Zn constituting 9.3–10.7 percent by weight of said filler metal, and said Cd constituting 0.03–12 percent by weight of said filler metal, said Bi, Sr, Ba, Sb and Be lowering the viscosity and surface tension of said filler metal in its molten state and substantially decreasing the interfacial tension between the molten filler metal and said workpieces, and said step being performed without a flux and in a substantially non-oxidizing atmosphere.

9. In a process as defined in claim 8, wherein said filler metal contains 0.002–0.1 percent by weight of Be.

10. In a process as defined in claim 8, wherein said filler metal contains 0.05–2 percent by weight of said at least one substance.

11. In a process as defined in claim 1, wherein said filler metal contains 12.1 percent by weight of Si, 0.10 percent by weight of Mn, 0.02 percent by weight of Mg, 0.38 percent by weight of Fe, 0.02 percent by weight of Ti, 0.01 percent by weight of Cu, 0.04 percent by weight of Zn, and 0.004 percent by weight of Be, the remainder being substantially aluminum.

12. In a process as defined in claim 1, wherein said filler metal contains 7.4 percent by weight of Si, 0.06 percent by weight of Mn, 0.03 percent by weight of Mg, 0.48 percent by weight of Fe, 0.02 percent by weight of Ti, 0.03 percent by weight of Cu, 0.10 percent by weight of Zn, and 0.083 percent by weight of Be, the remainder being substantially aluminum.

13. In a process as defined in claim 3, wherein said filler metal contains 11.9 percent by weight of Si, 0.08 percent by weight of Mn, 0.01 percent by weight of Mg, 0.32 percent by weight of Fe, 0.01 percent by weight of Ti, 0.02 percent by weight of Cu, 0.03 percent by weight of Zn, 0.04 percent by weight of Bi, and 0.014 percent by weight of Be, the remainder being substantially aluminum.

14. In a process as defined in claim 3, wherein said filler metal contains 9.8 percent by weight of Si, 0.05 percent by weight of Mn, 0.02 percent by weight of Mg, 0.27 percent by weight of Fe, 0.01 percent by weight of Ti, 0.02 percent by weight of Cu, 0.08 percent by weight of Zn, 0.75 percent by weight of Bi, and 0.036 percent by weight of Be, the remainder being substantially aluminum.

* * * * *